United States Patent [19]

Zucker

[11] 4,238,285
[45] * Dec. 9, 1980

[54] DIGESTER SYSTEM FOR DELIVERING WOOD CHIPS IN AN EVEN LAYER INTO A DIGESTER

[75] Inventor: Jerry Zucker, Lake Como, Fla.

[73] Assignee: Hudson Pulp & Paper Corp., New York, N.Y.

[*] Notice: The portion of the term of this patent subsequent to Oct. 17, 1995, has been disclaimed.

[21] Appl. No.: 950,373

[22] Filed: Oct. 11, 1978

Related U.S. Application Data

[63] Continuation of Ser. No. 740,315, Nov. 9, 1976, Pat. No. 4,120,748, which is a continuation of Ser. No. 565,567, Apr. 7, 1975.

[51] Int. Cl.³ .......................... D21C 7/06; D21C 7/14
[52] U.S. Cl. .................................... 162/242; 162/246
[58] Field of Search ............... 162/52, 246, 63, 68, 162/17, 57, 243, 248, 249, 233; 261/DIG. 76, 79 A; 214/17 C; 422/233

[56] References Cited

U.S. PATENT DOCUMENTS

| | | | |
|---|---|---|---|
| 1,593,147 | 7/1926 | Svenson | 162/68 |
| 1,813,205 | 7/1931 | Scholz et al. | 162/246 |
| 1,998,874 | 4/1935 | Koda | 162/246 |
| 2,901,039 | 8/1959 | Salmonson | 162/246 |
| 3,015,554 | 1/1962 | Rummel | 261/79 A |
| 3,255,999 | 6/1966 | Weston | 23/270 R |
| 3,347,741 | 10/1967 | Hutchison | 162/246 |
| 3,495,384 | 2/1970 | Alliger | 261/79 A |
| 3,881,986 | 5/1975 | Backlund | 162/68 X |
| 4,120,748 | 10/1978 | Zucker | 162/246 |

*Primary Examiner*—S. Leon Bashore
*Assistant Examiner*—Steve Alvo
*Attorney, Agent, or Firm*—Schuyler, Banner, Birch, McKie & Beckett

[57] ABSTRACT

A batch type digester for wood chips in which a stream of wood chips is delivered into the center of the top of the digester tank, while liquor is being delivered through a pair of pipes at the top of the tank. Simultaneous with the delivery of the wood chips and liquor, a steam vortex is formed in the upper part of the tank by a plurality of steam jets which are directed downwardly and tangentially and form spiral flow paths below the streams of chips and liquor. The wood chips and liquor are dispersed together and the liquor thoroughly wets the chips. The chips produce a substantially even layer as they fall to the bottom of the tank. The steam vortex maintains a negative relative pressure zone which promotes the dispersion of the stream of chips and the liquor.

2 Claims, 5 Drawing Figures

DIGESTER SYSTEM FOR DELIVERING WOOD CHIPS IN AN EVEN LAYER INTO A DIGESTER

This is a continuation of application Ser. No. 740,315, filed Nov. 9, 1976, now U.S. Pat. No. 4,120,748, which is a continuation of Ser. No. 565,567, 4/7/75.

This invention relates to digester systems for wood chips and the like and methods for operating such systems, and more, in particular, to batch-type digesters and methods for producing wood pulp for use in the manufacture of paper.

Wood pulp is produced by batch processes in large vertical-axis tanks to the tops of which wood chips are delivered along with liquor. It is an object of the present invention to provide an improved method and apparatus of that type. A further object is to obtain higher yields of high quality wood pulp. A still further object is to reduce the time required to carry on the digesting process. A still further object is to obtain uniform, efficient and dependable results with digester methods and apparatus of the type referred to above. These and other objects will be in part obvious, and in part pointed out below.

In the drawings showing an illustrative embodiment of the invention:

Figure 1:
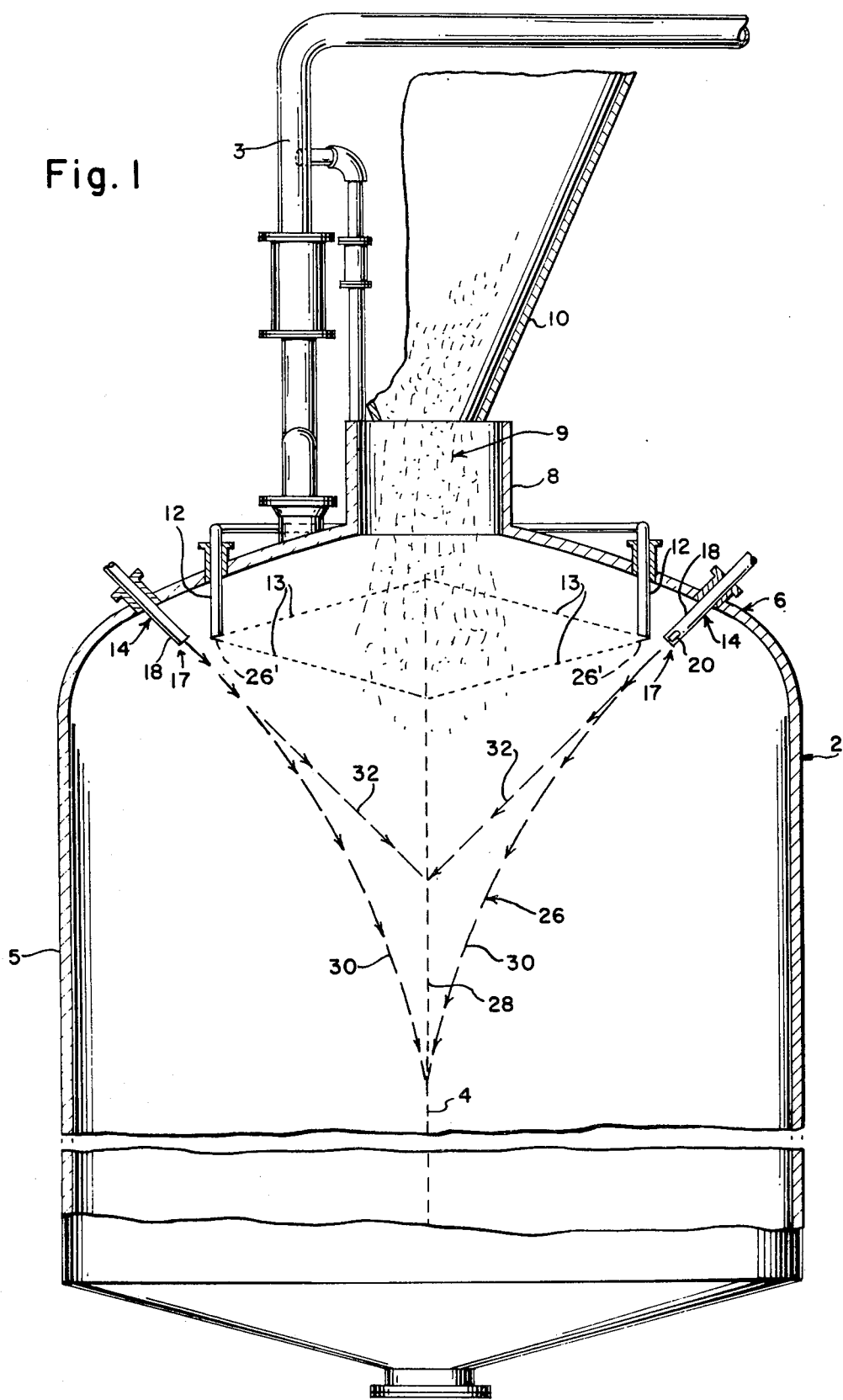
FIG. 1 is a vertical sectional view of a digester, with the central portion omitted, showing the manner in which wood chips, liquor and steam are delivered to the digester tank.

Referring to FIG. 1, a digester 2 has a known type of cylindrical tank 5 with a vertical axis 4, the top wall 6 of which is dome shaped. There is an opening in the center of the top wall which is surrounded by a cylindrical collar or chute 8 and through which a stream 9 of wood chips is fed by gravity from a hopper 10 into the top of the tank. A main liquor supply pipe 3 extends to the top wall of the tank (see also FIG. 2) and delivers a stream of liquor to the tank in a known manner. Positioned in a zone spaced radially outwardly relative to axis 4 with respect to the stream of wood chips are two vertical liquor spray pipes 12 that are connected to pipe 3 and extend through the top wall of the tank and thence downwardly a distance of the order of twelve inches. Two spray streams 13 of liquor are projected from these pipes generally horizontally and toward the axis of the tank. Also mounted in top wall 6 are two steam supply pipes 14 which are positioned respectively adjacent pipes 12, and through which steam is supplied to the tank from a header 16. Each of pipes 14 terminates in a nozzle assembly 17 which is mounted at any angle of the order 45° downwardly from the horizontal.

Figure 2:
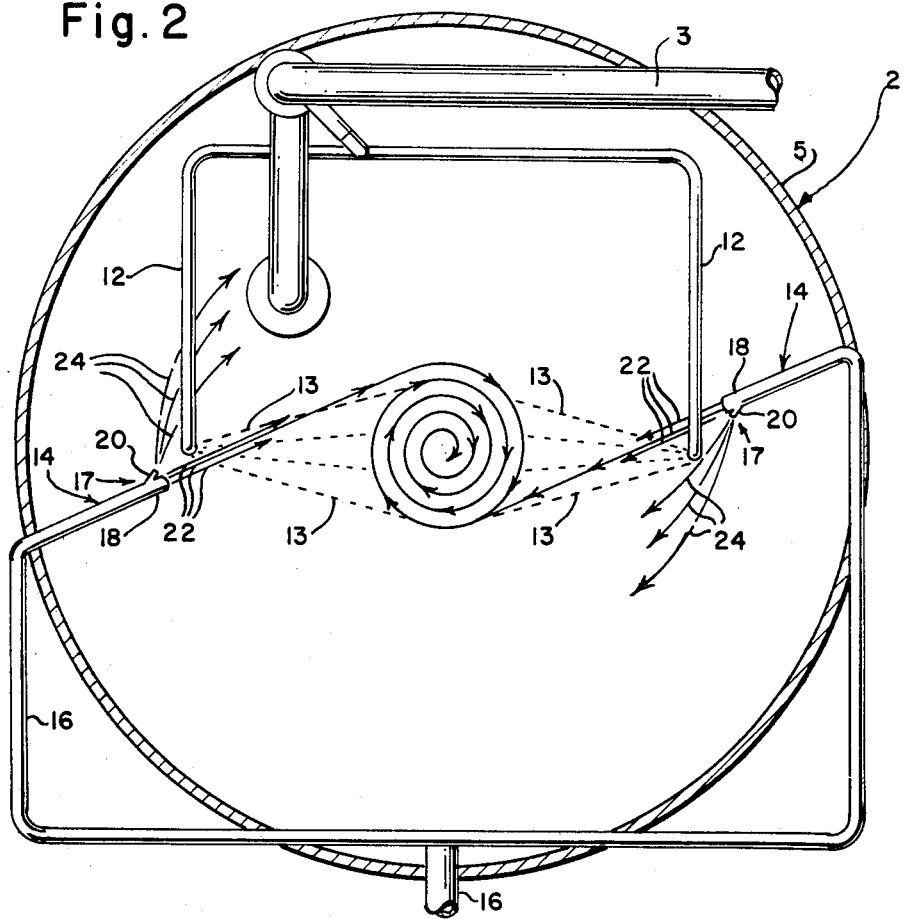
FIG. 2 is a top plan view of the digester tank of FIG. 1, with parts broken away, and with a schematic representation of the manner in which a steam vortex is produced within the tank.
Figure 5:
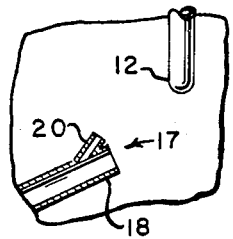
FIG. 5 is a partially sectional view showing a steam nozzle and the relationship with its liquor spray pipe.

Each nozzle assembly 17, which is also shown in FIG. 2 and somewhat enlarged in FIG. 5, is formed by a main nozzle 18 and an auxiliary nozzle 20 which has a smaller diameter than its main nozzle and is aimed at an angle of 30° from its main nozzle. Each main nozzle is at an angle of the order of 15° from a radial plane through axis 4. As is shown particularly in FIG. 2, each of the main nozzles 18 is aimed tangentially to a vortex 26 having its axis coextensive with axis 4. The steam from jets 18 are projected along paths represented by arrows 22, and the steam from jets 20 are projected along paths represented by lines 24. The chips and liquor falling downwardly are deflected by the steam from the main nozzles 18 so as to cause an initial rotary movement of the chips and liquor and produce the rapidly rotating vortex 26 in which the liquor and chips are entrained. Auxiliary nozzles 20 promote the continued rotation of the gases, steam, chips and liquor in the zone below the vortex.

Figure 3:
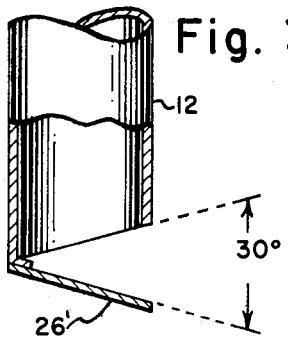
FIG. 3 is a vertical section of the lower end of one of the liquor-discharge pipes in FIG. 1.

The spray action of liquor delivered through each of pipes 12 is produced (see FIG. 3) by a metal disc 26 which is welded to the bottom of the pipe. The bottom end of the pipe is cut off at an angle of 15° upwardly from the horizontal and disc 26' is at an angle of 15° downwardly from the horizontal. That produces a jet opening of 30° the center of which is directed horizontally toward axis 4 of the tank. However, the fact that the jet opening is not closed at its sides causes the liquor to fan out somewhat horizontally. As shown in FIG. 1, each nozzle 18 is at substantially the level of the lower end of its pipe 12, and (see FIG. 2), each of the spray paths from pipes 12 intersects with the steam from its jet 18. Hence, the liquor spray is mixed with the steam forming the vortex.

Vortex 26 extends throughout the zone between lines 30 and 32 and has its maximum diameter at the top, which is less than the distance between the nozzle assemblies, and extends from there inwardly and downwardly. That vortex is below the falling stream 9 of chips and the spray streams 13 of liquor. As a result of the maintenance of vortex 26, as the stream of chips fall downwardly they are disbursed outwardly, and there is a simultaneous dispersion of the spray streams 13 of liquor radially inwardly, so that the liquor is distributed onto the chips and the chips become thoroughly wetted. The chips are distributed horizontally and spread to the side walls of tank 2 and are rotated with the vortex as they fall downwardly. Below vortex 26, the steam and the falling chips continue the clockwise rotation. The action is sufficient to insure the proper distribution of the chips and wood particles. The steam is condensed on the wood chips and wood particles, and the resultant condensate aids in thoroughly wetting the chips, but does not dilute the liquor below an acceptable strength.

The central portion 28 of vortex 26 is at a negative relative pressure, i.e., the pressure is below that at the periphery of the vortex and elsewhere in tank 4. That negative relative pressure is of the order of minus five at the bottom of the vortex, and is progressively less upwardly and there is a positive pressure at the top. That negative pressure condition is created by the action of the vortex and the interaction between the liquor-wetted chips. That is, as the wetted chips and any excess liquor move downwardly into the top of the vortex, the steam is cooled on contact with the chips and condenses thereon. Hence, while the chips and liquor are thoroughly intermingled, and the rotation tends to throw them radially outwardly by the action of centrifugal forces, the negative relative pressure tends to counteract the centrifical forces. That results in the desired even distribution horizontally in the chip dispersion zone below the vortex.

The chips fall in a substantially even layer in the bottom of the tank, and the fines settle in the interstices between the large chips. Hence, a tight pack is produced in which all of the chips and wood particles are thoroughly wetted, and in which the voids are at a minimum. When the tank is filled, the supplies of wood chips and liquor for pipes 12 are shut off, and the digesting process is then carried on generally in accordance with the prior procedures. However, the thorough wetting and uniform distribution of the chips and the liquor insure that the digesting steps are completed uniformly and in less time than previously necessary. Furthermore, the tight or close pack in the tank increases the yield from each batch as compared with prior processes.

Figure 4:
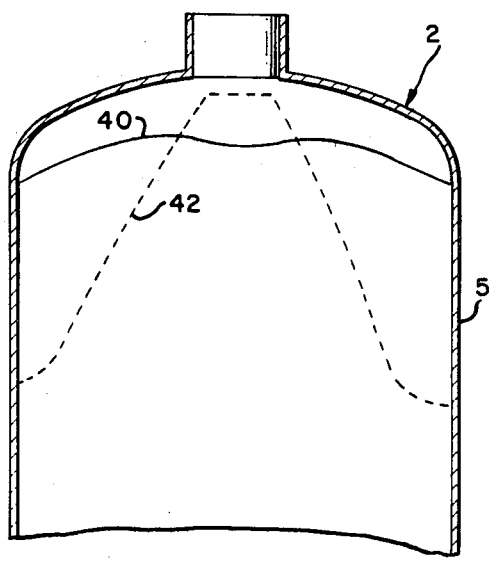
FIG. 4 is a simplified schematic vertical section of the filled digester tank showing the profile of the body of wood chips.

FIG. 4 shows at line 40 the level of the wood chips at the end of the chip delivery operation. This is contrasted with the contour represented by the broken line 42 which resulted from filling the tank without producing the vortex action by supplying steam to the steam jets. It is thus seen that the top of the tank has a substantially greater portion of its top filled with chips when the present invention is utilized.

In the illustrative embodiment, tank 5 has an external diameter of 12 feet with a wall thickness of 2 inches. The main jets 18 are projected so that their center lines are tangential to a cylindrical zone having axis 4 and of diameter of 26 inches. The center line of each of the spray streams 13 of liquor is at an angle in the horizontal of 25 degrees from the center line of its main steam jet. Each of the main steam jets is 1 inch in diameter and each of the auxiliary jets is ½ inch in diameter. During operation, the relative pressure above the vortex was plus five pounds. At the same time, the minimum relative pressure near the bottom center of the vortex was minus five pounds.

What is claimed is:

1. In a digester for producing pulp, the combination of, a digester tank which has a central vertical axis and a top wall with an opening the horizontal cross-section of which is substantially less than the horizontal cross-section of said tank and through which a stream of wood particles can be delivered into said tank so that the particles fall centrally into the tank in a zone along said vertical axis; spray means for spraying liquor transversely with respect to said tank and into said stream of wood particles so as to intersect and wet said stream of wood particles, said spray means being located within said tank below said top wall and within a zone spaced radially outwardly relative to said vertical axis and relative to the zone occupied by said stream of wood particles falling from said opening; and steam jet means which discharges steam and thereby produces a steam vortex with its axis substantially concentric with said vertical axis and adjacent said spray means, said steam jet means comprising a plurality of nozzle units each of which projects a jet of steam downwardly and substantially tangential to said stream of wood particles, said nozzle units being spaced circumferentially and cooperating with each other to produce said steam vortex and said steam jet means is positioned so the vortex forms below the intersection of liquor and wood particles whereby the liquor is distributed and directed by said vortex so as to wet said wood particles, and whereby the liquor-wetted wood particles are distributed radially of said vertical axis with the aid of the movement produced by said vortex.

2. In a digester for wood particles, the combination of; a closed tank formed by a substantially cylindrical vertical side wall structure and bottom and top walls with a port in said top wall through which a stream of wood particles can be delivered along a substantially vertical axis; means to deliver liquor to said stream of wood particles within a first zone directly below said port with the liquor moving horizontally and radially inwardly with respect to said axis; steam jet means for projecting a plurality of steam jets downwardly and tangentially with respect to said axis to produce a steam vortex within a second zone substantially concentric with said axis, said steam jet means being directed immediately below the first zone in which said liquor is delivered to said stream of wood particles whereby said stream of wood particles and said liquor move downwardly into said steam vortex, said steam jets being condensed onto said wood particles to reduce the pressure condition within the lower part of said vortex to a value which is less than that of the atmosphere surrounding said vortex, said wood particles and said liquor being thoroughly mixed and said wood particles wetted by said liquor and by the condensate of said steam, and said steam vortex distributing said wood particles radially outwardly relative to said axis and said wood particles falling to form a substantially even layer in said tank.

* * * * *